United States Patent [19]

Kennedy et al.

[11] Patent Number: 4,597,923
[45] Date of Patent: Jul. 1, 1986

[54] PRODUCTION OF REACTION-BONDED SILICON CARBIDE BODIES

[75] Inventors: Peter Kennedy, Preston; Kenneth Parkinson, Liverpool, both of England

[73] Assignee: United Kingdom Atomic Energy Authority, England

[21] Appl. No.: 645,342

[22] Filed: Aug. 29, 1984

[30] Foreign Application Priority Data

Sep. 9, 1983 [GB] United Kingdom ............... 8324166

[51] Int. Cl.$^4$ .............................................. C01B 31/36
[52] U.S. Cl. ................................. 264/29.4; 264/29.5; 264/60; 264/62; 423/345; 501/88; 501/90
[58] Field of Search ............... 423/345; 264/60, 62, 264/29.4, 29.5; 501/88, 90

[56] References Cited

U.S. PATENT DOCUMENTS

| | | | |
|---|---|---|---|
| 3,079,273 | 2/1963 | Johnson | 423/345 X |
| 3,882,210 | 5/1975 | Crossley et al. | 423/345 X |
| 4,067,955 | 1/1978 | Noakes et al. | 423/345 |
| 4,154,787 | 5/1979 | Brown | 423/345 X |
| 4,477,493 | 10/1984 | Parkinson et al. | 264/29.4 X |

FOREIGN PATENT DOCUMENTS

| | | | |
|---|---|---|---|
| 54-16521 | 2/1979 | Japan | 423/345 |
| 998089 | 7/1965 | United Kingdom | 423/345 |
| 887175 | 12/1981 | U.S.S.R. | 264/60 |

Primary Examiner—Jack Cooper
Attorney, Agent, or Firm—Larson and Taylor

[57] ABSTRACT

The production of a reaction-bonded silicon carbide artefact by siliconizing a green body comprising a coherent mixture of carbon and silicon carbide particles includes the step of forming a layer of carbon of open cellular structure on the green body by carbonization of a sleeve or tube on the green body by carbonization of a sleeve or tube of carbonaceous material in contact with the body. This material may be impregnated with particulate silicon suspended in water or a paste. The material may be a quilted or woven fabric of fibrous material or it may be in the form of paper. The material is in a flexible strip or sheet form to enable it to be wrapped around the green body or a former about which the green body is to be formed.

9 Claims, No Drawings

PRODUCTION OF REACTION-BONDED SILICON CARBIDE BODIES

BACKGROUND OF THE INVENTION

This invention relates to the production of reaction-bonded silicon carbide bodies.

Reaction-bonded silicon carbide bodies are produced by reaction sintering of a coherent mixture (or green body) of carbon and silicon carbide powders in the presence of molten silicon (hereinafter referred to as "siliconising") whereby the carbon in the mixture is converted to bonding silicon carbide and a substantially continuous silicon carbide matrix is formed in a substantially continuous free silicon phase.

In one method of siliconising molten silicon is drawn upwards through a green body of carbon and silicon carbide by capillary action. Porosity has accordingly to be provided in that body to allow infiltration of the molten silicon. The rate of climb of the molten silicon through such a green body is proportional to the pore size in the body and inversely proportional to the height reached. The greater the porosity, therefore, the more rapid the infiltration of silicon and the completion of the conversion of all the carbon in the green body to bonding silicon carbide. However, the greater the porosity which is provided, the higher the proportion of silicon in the reaction-sintered body, and the presence of an excess of free silicon in the body may have a deleterious effect on the desired properties of the reaction-sintered body. On the other hand, if the porosity is insufficient, the infiltration may be inhibited to such an extent that conversion of carbon to silicon carbide is incomplete or impracticably slow and in considering this factor account has to be taken not only of the initial porosity but of the increase in molecular volume when carbon is converted to silicon carbide so that there is a tendency for the newly formed, bonding silicon carbide to fill the available porosity and block off the flow of molten silicon through the body. Reducing the proportion of carbon in the green body and hence the formation of bonding silicon carbide does not necessarily provide a satisfactory solution however, because, in general, the lower the proportion of carbon in the green body the higher the proportion of free silicon present after siliconising.

The introduction of additional porosity in the outer layer of a green body by reaction of the carbon therein with silicon monoxide vapour has already been described, for example, in UK Patent Specification No. 1,180,918. By this method surface porosity can be enhanced from about 10% up to 40% and the surface pore size from about 1 micron to up to 10 microns. The rate of climb is thus increased by about an order of magnitude and, because silicon can now infiltrate the body laterally as well as vertically a 450 mm length can be siliconised in about four hours but double the length (900 mm) would however take four times as long (at least 16 hours). This may be commercially unacceptable. The present invention seeks to provide means whereby the rate of climb by molten silicon may be further accelerated and also to avoid or reduce the gradation in free silicon content which may be a disadvantageous result of the production of reaction-sintered bodies using the above method.

It has already been proposed in U.S. Pat. No. 4,301,132 that composite green bodies should be produced in which one portion contains a lower proportion of carbon to silicon carbide than a second portion. If the portion containing the lower proportion of carbon is a layer or coating on a surface of the second portion it may, by suitable selection of the porosity of that layer or coating, provide a pathway for molten silicon to the upper parts of the composite body whereby the silicon reaches those upper parts more readily than by passage through the second portion. Such silicon can then infiltrate the second portion laterally in contrast to the substantially vertical alternative route through the second portion. After siliconising the surface layer or coating, containing an excess of free silicon, may be removed from the second portion. One way of doing this is to leach out the free silicon with alkali to leave, on the surface of the second portion, a reaction-sintered silicon carbide skeleton which can be machined away.

FEATURES AND ASPECTS OF THE INVENTION

According to the present invention the production of a reaction-bonded silicon carbide artefact by siliconising a green body comprising a coherent mixture of carbon (typically graphite) and silicon carbide powders includes the step of forming a layer of carbon of open cellular structure on the green body by carbonisation of a layer (which may be in the form of a sleeve or tube) of carbonaceous material in contact with the body.

On siliconising the carbon layer is converted to a silicon carbide skeleton and silicon drawn through the carbon layer and the silicon carbide skeleton by capillary action can facilitate siliconising of the whole green body because as well as being able to climb very rapidly the molten silicon can move laterally into the green body.

The carbonaceous material of which the sleeve or tube is formed may comprise a quilted or woven fabric of material fibre, such as cotton or sheet material such as paper. The fabric or sheet material may also be produced from synthetic material. The sleeve or tube may be impregnated with silicon. Conveniently, impregnation is effected by spraying or coating the carbonaceous layer with particulate silicon suspended in a flowable carrier medium, eg. water or a paste. Incorporation of silicon into the carbonaceous layer affords the advantage that, at appropriate temperatures, the carbon can react with the impregnated silicon to form a silicon carbide skeletal structure and consequently reliance is not placed on the infiltrating silicon, during siliconising, for the conversion of the carbon in the carbonised layer to silicon carbide.

If the green body is hollow, for example, tubular, the sleeve or tube may be provided on the inner or outer surface of the green body or on both surfaces. A sleeve or tube for an inner surface may be provided on a mandrel or other former on which the green body is to be formed.

In a preferred embodiment, the method of the invention includes the steps of: (a) applying a layer of carbonaceous material to a mandrel or other former so as to form said layer into a tube or sleeve; (b) incorporating into said layer particles of silicon; (c) pressing a coherent mixture of powdered carbon and silicon carbide with binder around the mandrel or former and hence around said tube or sleeve of carbonaceous material so as to form said green body; and (d) subjecting the composite of said green body and said sleeve or tube to heat treatment so as to carbonise said carbonaceous material and thereby produce an open cellular carbon structure which can be converted into a silicon carbide skeletal structure by reaction with the particulate silicon incorporated in said layer.

It is convenient for the sleeve or tube to have the ability to stretch so that it is more readily fitted about a green body or former and will cling to the green body. The sleeve or tube may be formed about the green body from a strip or sheet which is wrapped around the green body or former. A strip may be particularly suitable if the sleeve or tube is to follow a complex profile on the green body. The degree of flexibility, resilience and elasticity required in the sleeve or tube will depend on the shape it is to take up about the green body. The sleeve or tube is not necessarily in the form of a right circular cylinder.

A sleeve or tube on an inner surface may be closed off at its lower end to provide a containment for silicon for siliconising the green body. The carbonisation of the sleeve or tube and the subsequent siliconising then take place, of course, in a single stage.

Siliconising may be effected by heating the green body in the presence of molten silicon at a temperature in the range of 1400°–1650° C. Carbonisation of the sleeve or tube of carbonaceous material may be effected at much lower temperatures, for example 300°–400° C.

On cooling down of a siliconised body excess silicon (which expands on freezing) is exuded. It bleeds out on to the surface of the body and usually forms modules which can be removed by grit blasting or by leaching with alkali but silicon removal by such means may be non-uniform. When using this invention however the exuded silicon can form a much more uniform layer in association with the open porous silicon carbide skeleton formed on siliconising. Silicon removal by grit blasting is accordingly facilitated and so is uniform leaching of excess silicon. After silicon removal by leaching the silicon carbide skeleton remaining is friable and may be rubbed off.

EXAMPLE

A length of tubular elasticated bandage (such as that sold under the trade name 'Tubigrip') is slipped over a steel isostatic pressing mandrel. The bandage is impregnated with silicon by spraying with an aqueous suspension of the finely divided metal and is allowed to dry at room temperature.

The mandrel is placed in a polyurethane rubber bag which will decompose in the subsequent heating steps. The space between the bag and the coated mandrel is filled with a standard pressing mix containing carbon, silicon carbide and a plastic binder; the bag is sealed with a polyurethane rubber closure and the whole assembly is pressed isostatically at about 100 MPa. In this process a composite is formed which consists of a relatively thick ie. 1 cm carbon/silicon carbide tube with a 0.5 mm inner layer of bandage and silicon strongly bonded to it.

The tube is removed from the tool and is heated to a temperature between 300°–400° C. to remove the binder and carbonise the bandage. It is then heated in a nominal vacuum to 1650° C. with its lower end in contact with free silicon when: the silicon in the coating reacts with the carbon to form a 10–20% dense silicon carbide skeleton; the silicon in the base of the crucible is wicked up through the porous surface layer; and the silicon moves radially outwards from the porous surface layer through the green carbon/silicon tube converting it to self-bonded silicon carbide.

After firing the silicon in the silicon-rich surface layer is leached out with sodium hydroxide solution and the friable silicon carbide is removed by brushing or gritblasting. Using the above technique the firing rate is enhanced considerably and it is possible to siliconise a 450 mm length of tube in about one hour.

We claim:

1. A method of producing a reaction-bonded silicon carbide artefact comprising applying a layer of a solid, flexible, and fibrous essentially carbonaceous material on a green body comprising a coherent mixture of carbon and silicon carbide powders, subjecting said layer to carbonization to form a solid layer of essentially carbon of open cellular structure on the green body and then siliconizing the resulting body to produce said reaction-bonded silicon carbide artefact.

2. A method as claimed in claim 1 in which the carbonaceous material is initially applied to a mandrel or other former about which the green body is subsequently formed so that the layer of carbonaceous material contacts internal surfaces of the green body.

3. A method as claimed in claim 1 in which the carbonaceous material is in the form of a flexible strip or sheet material.

4. A method as claimed in claim 1 in which said carbonaceous layer is impregnated with silicon in particulate form prior to siliconising.

5. A method as claimed in claim 5 in which said particulate silicon is suspended in a flowable carrier medium which is sprayed or coated onto said carbonaceous layer.

6. A method as claimed in claim 1 in which said carbonaceous layer is formed into a tube or sleeve which encloses, or is enclosed within, the green body.

7. A method as claimed in claim 1 in which carbonisation of said layer occurs during the siliconising stage.

8. A method of producing a reaction-bonded silicon carbide artefact by siliconising a green body comprising a coherent mixture of carbon and silicon carbide powders, which method includes the steps of:

(a) applying a layer of solid, flexible and fibrous carbonaceous material to a mandrel or other former so as to form said layer into a tube or sleeve;
  (b) incorporating into said layer particles of silicon;
  (c) pressing a coherent mixture of powdered carbon and silicon carbide with binder around said tube or sleeve of said carbonaceous material so as to form said green body; and
  (d) subjecting the composite of said green body and said sleeve or tube to heat treatment so as to carbonise said carbonaceous material to thereby produce an open cellular carbon structure and then siliconizing the resulting body to produce said reaction-bonded silicon carbide artefact.

9. A method as claimed in claim 8 in which said tube or sleeve is formed by wrapping a flexible strip or sheet of said carbonaceous material around said mandrel or former.

* * * * *